INVENTOR.
CLARENCE B. RICHEY
BY
Tweedale & Gerhardt
ATTORNEYS.

INVENTOR.
CLARENCE B. RICHEY
BY
Tweedale & Gerhardt
ATTORNEYS.

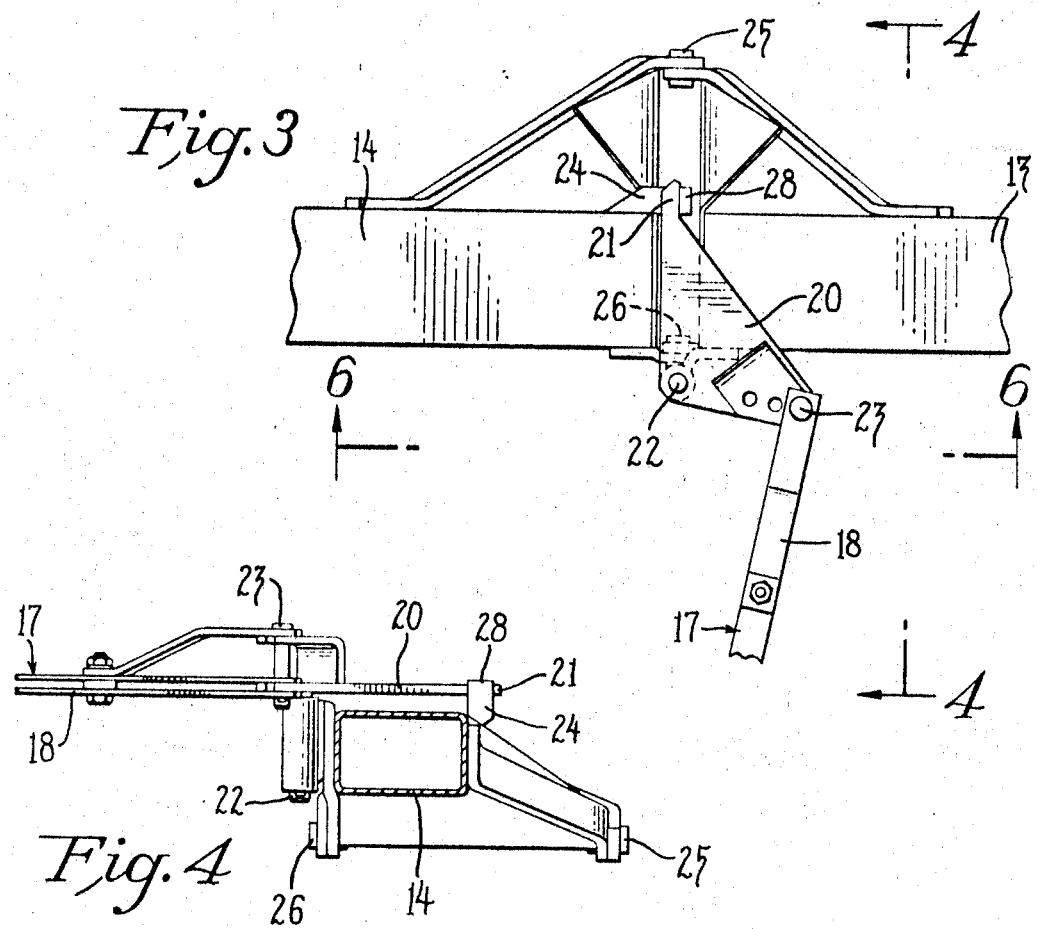
Fig. 3
Fig. 4
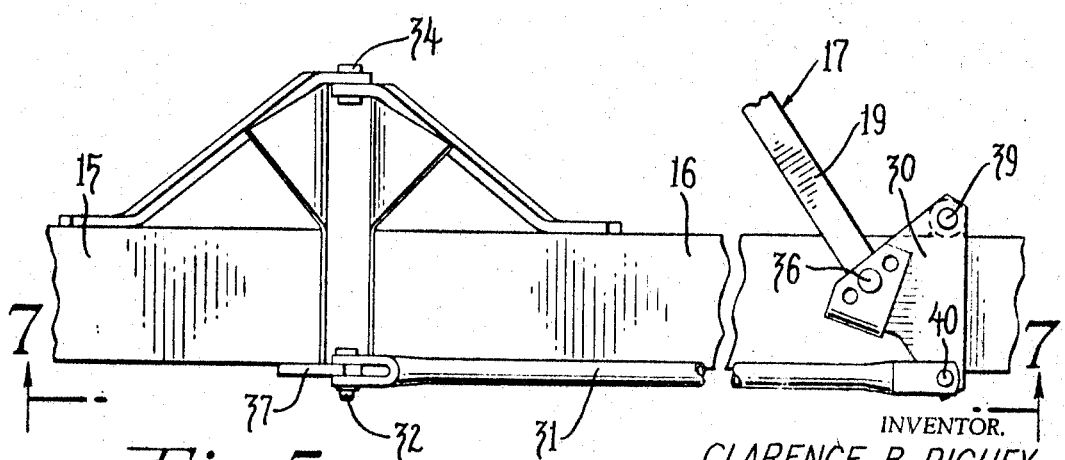
Fig. 5
INVENTOR.
CLARENCE B. RICHEY
BY
Tweedale & Gerhardt
ATTORNEYS.

United States Patent Office 3,460,632
Patented Aug. 12, 1969

3,460,632
FLEXIBLE OFFSET DISC HARROW
Clarence B. Richey, Fresno, Calif., assignor to Massey-Ferguson Inc., Detroit, Mich.
Filed Jan. 11, 1966, Ser. No. 519,924
Int. Cl. A01b 21/08
U.S. Cl. 172—596    9 Claims

ABSTRACT OF THE DISCLOSURE

A flexible offset disc horrow having pivotally connected front and rear gangs each having an inner section and a vertically pivotable outer section with the inner sections pivotally connected to form the pivot between the gangs. The front gang discs act to dig in the ground while the oppositely forced rear gang discs act to lift out of the ground. A draft and leveling linkage extends between the front and rear gangs and includes a lever pivotally carried by each of the outer sections. There is an operative connection between each of the levers and the adjacent inner section. An adjustable length force transmitting member connects the lever to transmit draft forces between the front and rear gangs and at the same time provide a lifting force on the front outer section and a lowering force on the rear outer section. The operative connection between one of the levers and its associated inner section is a one-way connection permitting relative vertical movement between one of the outer sections and the other sections.

---

This invention relates to offset disc harrows and more specifically to an articulated structure for leveling portions of the disc gangs during operation of such a harrow.

In order to cover large soil areas in harrowing operations the disc gangs have been made wider and wider. This development has led to the need for articulating the gangs rather than using rigid lengths of disc gangs. During operation of offset disc harrows with long disc gangs, the soil working forces tend to cause the free end portions of the articulated disc gangs to either dig into the soil too deeply, or rise above the soil, respectively.

Accordingly, the invention consists in a force transmitting structure interconnecting the front and rear gangs of a flexible offset disc harrow in such a manner that the structure is adapted to react to the draft force which is used to pull the outer end of the rear gang upon pulling of the harrow. The effect of said draft force on the force transmitting structure causes the structure to level the gangs.

In order that the invention may be more clearly understood, a preferred embodiment will now be described with reference to the accompanying drawings in which:

FIG. 3 is a plan view of the link between the two portions of the front disc gang one one end of the force transmitting structure;

FIG. 4 is a sectional view taken along line 4—4 in FIG. 3;

FIG. 5 is a plan view of the link between the two portions of the rear disc gang and the other end of the force transmitting structure;

Figure 1:
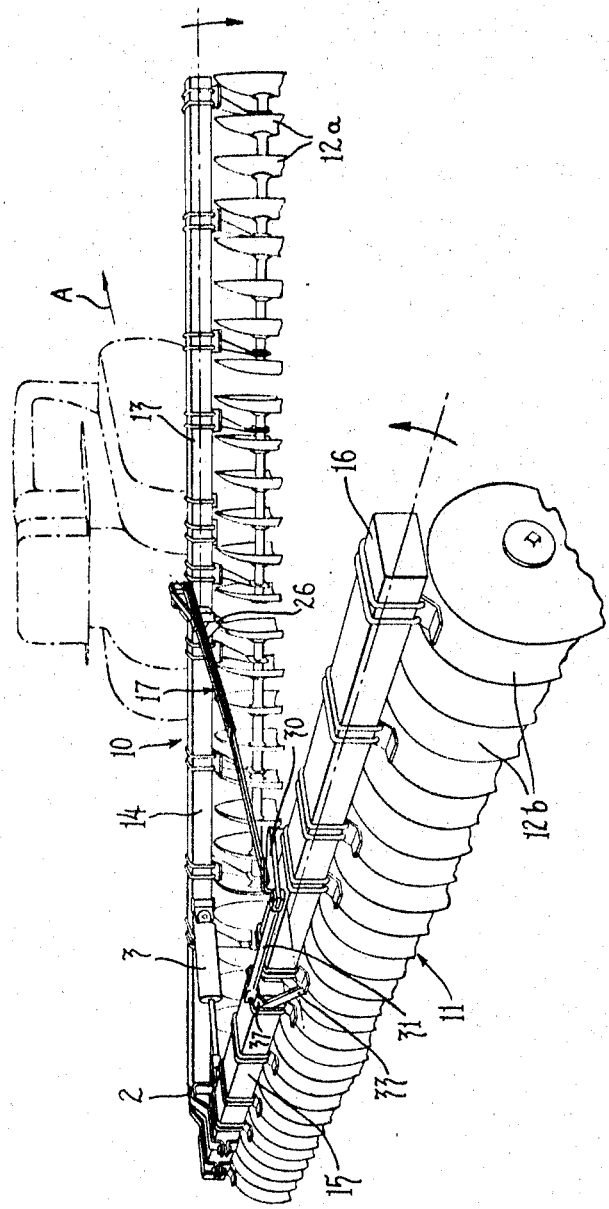
FIG. 1 is a perspective view of an offset disc harrow including the invention.

In FIG. 1 an offset disc harrow is shown which is pulled by a tractor or the like in the direction indicated by the arrow A. The harrow two offset disc gangs 10 and 11 of considerable length which are pivotally interconnected at the pivot 2. A closing device or ram 3 conventional structure, preferably comprising a cylinder and piston, is used to straighten the angular opening between the gangs 10 and 11 for turning or for transport. It is also used to open the gangs to the point where the force transmitting structure is pulling the rear gang. The cylinder has a lost motion connection at one end so it does not carry any load during operation.

The front disc gang 10 consists of two portions 13 and 14 which have pivoted for relative movement in a vertical plane at a pivoting axis of which only pivot point 26 can be seen in FIG. 1. The rear disc gang 11 likewise consists of two portions 15 and 16 which are pivoted for relative movement in a vertical plane at a horizontal pivoting axis which only pivot point 33 can be seen in FIG. 1. As during operation of the harrow the gang portion 13 with the dish-shaped discs 12a being open toward the free end of the gang, tends to dig too deeply into the soil, and the gang portion 16 on which the dish-shaped discs 12b have their open sides turned toward the pivot point 2, tends to rise, a force transmitting structure 17 is provided which equalizes the effect of these undesirable vertical forces.

Figure 2:
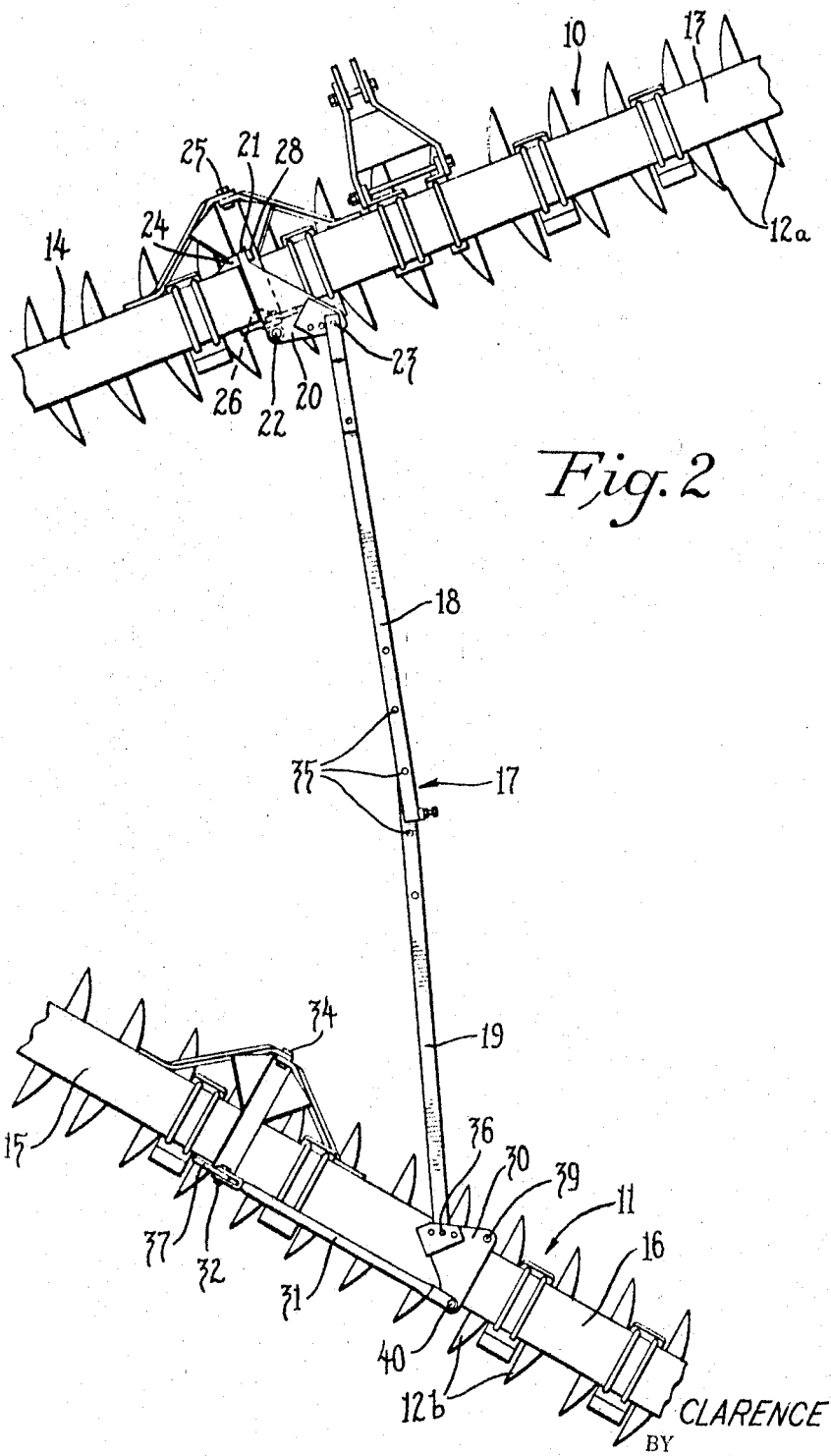
FIG. 2 is a plan view of the central portion of the harrow shown in FIG. 1.

As more clearly shown in FIG. 2 the force transmitting structure 17 comprises two members 18 and 19 which can be interconnected at each desired pair of holes 35, depending upon the set angular position of the gangs.

Member 18 is pivotally connected at its front end with a bell crank 20 ot a pivot 23. Spaced extra pivot holes are provided in the bell brank 20 to allow changing of the leverage.

Figure 6:
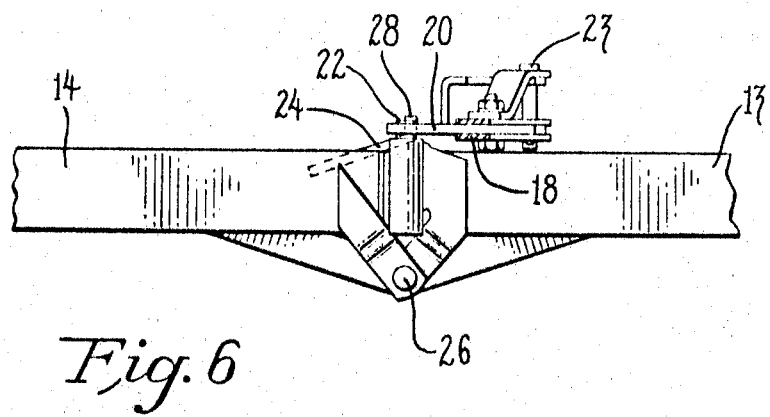
FIG. 6 is a view taken along the line 6—6 of FIG. 3.

As best shown in FIG. 3 the bell crank 20 with its nose 21 can rotate around its pivot 22. The bell crank 20 is pivoted on the end of the gang portion 13 which adjoins the gang portion 14, by means of the pivot pin 22 (FIGS. 2, 3 and 6). The pivot axis of pivot pin 22 is normal to the pivot axis 25, 26 intermediate the two gang portions 13 and 14. The outer end of the inner disc gang portion 14 carries a retaining member 24 with an upturned lug or abutment 28.

Figure 7:
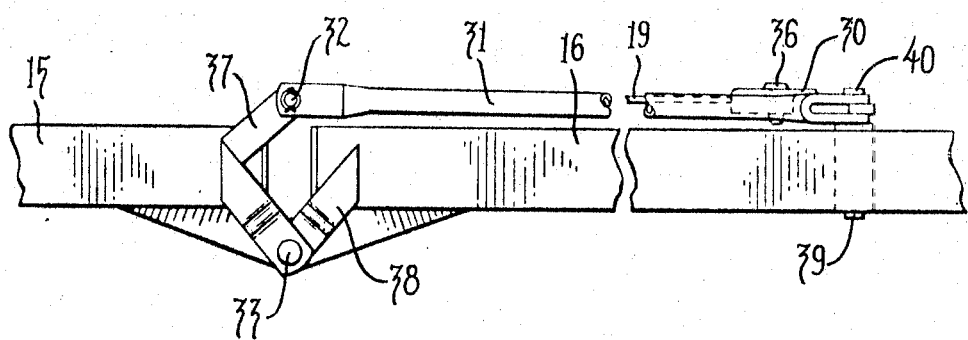
FIG. 7 is a view taken along the line 6—6 of FIG. 5.

The member 19 of the motion transmitting structure 17 is pivotally connected at pivot 36 with a bell crank 30 which in turn is pivoted on the gang portion 16 at a pivot 39. Spaced extra pivot holes are provided in the bell crank 30 to allow changing of the leverage. The bell crank 30 is spaced from the pivot axis 33, 34 and connected at a pivot 40 with the gang portion 15 by a push rod 31 (FIGS. 2, 5 and 7) which is pivoted to a bracket 37 at the pivot 32. The bracket 37 is fixed to one end of the gang portion 15 and is downwardly and upwardly directed, whereas a downwardly directed bracket 38 (FIG. 7) is fixed to the adjoining end of the gang portion 16. The brackets 37 and 38 are joined at pivot 33; and at pivot 32 on the upper end of the bracket 37 the push rod 31 is pivotally attached.

In operation, as the harrow is pulled over the ground, no force is transmitted between the gangs by the hydraulic ram 3 due to its lost motion connection so that the ram 3 is not under pressure. The draft force is transmitted from the front gang 10 to the rear gang 11 by the force transmitting structure 17, and consequently, the structure 17 is maintained under tension.

As pointed out previously, the front outer gang portion 13 tends to pivot downwardly about pivot axis 25, 26 due to the effect of soil forces on the discs, and the rear outer gang portion 16 tends to pivot upwardly about pivot axis 33, 34. The draft force acting through members 18 and 19 of the force transmitting structure 17 tends to rotate bell crank 20 clockwise as viewed in FIG. 2, which movement is resisted by tie engagement of nose 21 with lug 28 on portion 14. This resistance force tends to pull gang portion 13 upwardly about pivot axis 25, 26 since the bell crank 20 is mounted on portion 13 and lug 28 is mounted on portion 14. Furthermore, the tension in member 18 and 19 resulting from the draft force tends to rotate bell crank 30 in a clockwise direction (as viewed in FIG. 2) about pivot 39 and urge push rod 31 toward the left thereby exerting forces on the rear outer gang portion 16 tending to cause portion 16 to move downwardly and counteract the soil forces acting on the discs carried by portion 16.

Upward movement of the front outer gang portion 13 about pivot 26 for example, upon passing of the gang portion 13 over a rise, causes pivot point 22 to move toward the left in FIG. 2 which tends to separate nose 21 from lug 28. However, since the draft force tends to cause the rear gang 11 to separate from the front gang 10 about pivot point 2, this force causes bell crank 20 to rotate in a clockwise direction about pivot point 22 to maintain nose 21 in engagement with lug 28. This action tends to maintain uniform penetration of the discs even when the outer gang portion passes over a rise in the ground surface.

Moreover, when the rear outer gang portion 16 passes over a rise, the resulting upward movement of portion 16 about pivot point 33 tends to cause bell crank 30 to pivot in a counterclockwise direction and increases the tension in structure 17 tending to cause the rear gang 11 to move forwardly toward the front gang 10 until the forces are balanced.

In summary, by applying the draft force required to pull the rear gang 11 to the bell cranks 20 and 30, a downwardly directed force is applied to the rearwardly located gang portion 16 and a upwardly directed force to the forwardly located gang portion 13, thereby counteracting the undesirable forces which occur during the operation of a flexible offset disc harrow and securing level operation of both outer gang portions thereof.

I claim:

1. In a flexible offset disc harrow comprising a front and a rear disc gang, each having inner and outer portions connected end to end for relative vertical movement with respect to each other and means pivotally connecting the ends of said inner portions opposite said outer portions, and wherein soil forces acting on said outer portions tend to cause one of said outer portions to dig into the soil too deeply and the other of said outer portions to lift out of the soil and a force transmitting means interconnecting said front and rear gangs to transmit draft forces between said front and rear gangs and for counteracting said soil forces to cause said outer portions to work at substantially the same depth as said inner portions, characterized in that said force transmitting means comprises linkage means independently engaging both the inner and outer portions of said gangs and being responsive to the inner and outer portions of said gangs and being responsive to the draft force to exert forces on the outer gang portions in a direction to counteract the effect of said soil forces.

2. In a flexible offset disc harrow comprising a front and a rear disc gang having an inner and an outer portion each in vertically pivoting connection with each other, said disc gangs being interconnected at one side and open toward the other side, the combination comprising a draft force transmitting structure intermediate said front and rear disc gang, means at the front end of said draft force transmitting structure independently engaging each of the adjoining ends of the inner and outer portions of front disc gang for transmitting the draft force applied thereto to the front disc gang for leveling action and a means at the rear end of said force transmitting structure in leveling force transmitting connection with both adjoining ends of the rear disc gang for transmitting the draft force applied thereto to the rear disc gang for leveling action.

3. The combination as claimed in claim 2 wherein said means at the front end of said force transmitting structure comprise a bell crank having a lug, said crank being pivotally connected to the front end of said force transmitting structure, a pivot at the end of the outer portion of the front disc gang joining the inner portion of the front disc gang for verticaly pivoting movement, said pivot having an axis normal to the pivoting axis connecting the two portions for vertically pivoting movement and pivotally carrying said bell crank, and a retaining member at the inner portion of the front disc gang opposite said pivot point, said retaining member having an upwardly turned nose for engagement with the lug of said bell crank.

4. The combination as cliamed in claim 2 wherein said means at the rear end of said force transmitting structure comprise a bell crank pivotally connected to the rear end of said force transmitting structure, a pivot at the outer portion of the rear disc gang spaced from the axis for vertically pivoting movement of the outer portion of the rear disc gang relative to the inner portion thereof, said pivot carrying the bell crank, a downwardly directed bracket at the end of the outer portion of the rear disc gang joining the inner portion thereof, a downwardly and an upwardly directed bracket at the end of the inner portion of the rear disc gang joining the outer portion thereof, a pivoting connection between the downwardly directed brackets, and a push rod, pivotally linked at one side thereof to the upwardly directed bracket at the inner portion of the disc gang and pivotally linked at the other side to the bell crank.

5. The combination as claimed in claim 2 further comprising a closing device intermediate said front and rear disc gangs for setting the angle between the front disc gang and the rear disc gang of the harrow.

6. The combination as claimed in claim 5 wherein said closing device comprises a cylinder and a piston having a lost motion connection at one end thereof.

7. The combination as claimed in claim 2 wherein said force transmitting structure comprises two members having a plurality of apertures in their adjoining ends, said apertures allowing interconnection at various distances and lateral pivoting of the members relative to each other upon collapsing of the disc gangs of the harrow for transportation thereof.

8. The combination as claimed in claim 4 wherein a plurality of pivot-receiving apertures is provided in each bell crank for varying the lever arms formed between the bell cranks and the members of the motion transmitting structure.

9. A flexible offset disc harrow having a front disc gang and a rear disc gang with each gang having an inner portion pivotally connected to the other inner portion at one end thereof on a vertical axis and an outer portion pivotally connected to the other end of each inner portion on a substantially horizontal axis, the discs of one gang arranged so that soil forces acting hereon tend to cause it to dig into the ground and the discs of the other gang arranged so that the soil forces tend to cause it to lift out of the ground, a combined draft transmitting and gang leveling means interconnecting said front and rear gangs comprising lever means carried by each of said front and rear gangs, said lever means being pivotally carried on one of the inner or outer portions of each gang and having a force transmitting connection to the other of said inner or outer portions, linkage means connecting said levers and arranged so that horizontal draft forces between said gangs causes the lever on the gang having discs acting to dig into the ground to counteract such action and causes the lever on the gang having discs acting to lift out of the ground to counteract such action, one of said force transmitting connections being a one way connection permitting vertical pivoting of one of the outer sections relative to its adjacent inner sections.

References Cited
UNITED STATES PATENTS 2,303,320 12/1942 Benjamin et al. ____ 172—596 X
2,568,082 9/1951 McKay _____ 172—596
2,604,746 7/1952 Frank et al. _____ 172—56

ANTONIO F. GUIDA, Primary Examiner
ALAN E. KOPECKI, Assistant Examiner

172—753, 777